United States Patent
Iacovoni et al.

(10) Patent No.: US 8,127,499 B2
(45) Date of Patent: Mar. 6, 2012

(54) RELIEF LIP FOR FLOCKED TAPE BELT SEAL

(75) Inventors: Donald P. Iacovoni, Plymouth, MI (US); Paul L. Heirtzler, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 12/415,424

(22) Filed: Mar. 31, 2009

(65) Prior Publication Data

US 2010/0242373 A1   Sep. 30, 2010

(51) Int. Cl.
  E06B 7/16    (2006.01)
(52) U.S. Cl. .................. 49/441; 49/475.1; 49/490.1
(58) Field of Classification Search .......... 49/440, 49/441, 475.1, 374, 377, 490.1, 495.1
See application file for complete search history.

(56) References Cited

U.S. PATENT DOCUMENTS

| | | | |
|---|---|---|---|
| 4,604,830 A * | 8/1986 | Maeda et al. | 49/374 |
| 5,010,689 A * | 4/1991 | Vaughan | 49/440 |
| 5,414,961 A * | 5/1995 | Tessier | 49/441 |
| 5,544,448 A * | 8/1996 | Mass | 49/377 |
| 5,775,030 A * | 7/1998 | Hamabata | 49/377 |
| 5,846,463 A | 12/1998 | Keeney et al. | |
| 6,119,406 A * | 9/2000 | Gulisano et al. | 49/502 |
| 6,141,854 A * | 11/2000 | Mueller et al. | 29/450 |
| 6,279,987 B1 * | 8/2001 | Keeney et al. | 296/146.9 |
| 6,409,251 B1 * | 6/2002 | Kaye et al. | 296/146.9 |
| 6,652,952 B2 * | 11/2003 | Drozd et al. | 428/122 |
| 6,681,526 B2 * | 1/2004 | Mueller et al. | 49/440 |
| 7,237,359 B2 * | 7/2007 | Aritake et al. | 49/441 |
| 2001/0001916 A1 * | 5/2001 | Nozaki | 49/414 |
| 2001/0025454 A1 * | 10/2001 | Cretin | 49/441 |
| 2002/0184826 A1 * | 12/2002 | Nozaki | 49/441 |
| 2007/0101657 A1 | 5/2007 | Okajima et al. | |
| 2007/0251152 A1 * | 11/2007 | Takase et al. | 49/441 |
| 2008/0302022 A1 * | 12/2008 | Knight et al. | 49/490.1 |
| 2010/0011671 A1 * | 1/2010 | Gentemann | 49/489.1 |

FOREIGN PATENT DOCUMENTS

| | | |
|---|---|---|
| ES | 2244360 | 12/2005 |
| GB | 2388866 | 11/2003 |
| WO | WO0117809 | 3/2001 |
| WO | WO2007057766 | 5/2007 |

* cited by examiner

*Primary Examiner* — Blair M Johnson
*Assistant Examiner* — Justin Rephann
(74) *Attorney, Agent, or Firm* — Gregory P. Brown; Price Heneveld LLP

(57) ABSTRACT

A belt seal structure for engaging a glass window of an automobile. Included is an inner belt seal and an outer belt seal, both the inner and outer belt seals engageably attached to at least one flange of an automobile door frame. Also included is a plurality of sealing lips connected to and extending away from the inner and outer belt seals, where a surface portion of the sealing lips contact the glass window. The contacting surface portion is covered with the low friction material. Further included is a relief lip of at least one of the sealing lips. The relief lip is located proximate a substantially curved contacting surface portion of the sealing lip, where the low friction material extends to cover a surface of the relief lip.

20 Claims, 4 Drawing Sheets

US 8,127,499 B2

RELIEF LIP FOR FLOCKED TAPE BELT SEAL

FIELD OF THE INVENTION

The present invention generally concerns belt seal structures for engaging a glass window of an automobile, and more particularly relates to a relief lip for flock tape belt seals.

BACKGROUND OF THE INVENTION

Door belt seals are commonly employed to provide a sealing function for automotive glass windows. A low friction material is often applied to sealing members of automotive door belt seals during the extrusion process. The sealing members typically include curved surfaces that require adhesion of the low friction material. However, a common failure occurs when the edges of the low friction material lose adhesion to the curved surface of the sealing member to which the low friction material is applied. Upon the loss of adhesion, the low friction material typically lifts away from the belt seal, causing noise, vibration, and other issues as the glass window moves up and down during consumer usage.

SUMMARY OF THE PRESENT INVENTION

One aspect of the present invention is to provide an automotive door. The automotive door has a door frame and a glass window. The door also has a belt seal structure for engaging the glass window. Included is an inner belt seal and an outer belt seal, where both the inner and the outer belt seals engageably attach to at least one flange of the automobile door frame. Also included is a pair of upper sealing lips, where both the inner and outer belt seals have one of the upper sealing lips connected to and extending away from the inner and outer belt seals. The upper sealing lip is a flexible material capable of bending to accommodate passage of the glass window. A surface portion of the upper sealing lips is covered with a low friction material. The surface portion consists of regions where the glass window contacts the upper sealing lips. At least one lower sealing lip is connected to and extends away from the inner or outer belt seal, where the lower sealing lip is a flexible material capable of bending to accommodate passage of the glass window. A surface portion of the lower sealing lip is covered with a low friction material. The surface portion consists of regions where the glass window contacts the lower sealing lip, where the covered surface portion has a body section with a substantially planar geometry and a lower and upper section with a substantially curved geometric configuration. Further included is a relief lip extending from the lower sealing lip. The relief lip is located proximate the lower or upper section of the covered surface portion. The relief lip extends along a direction of a substantially similar plane as the body section of the covered surface portion, where the low friction material extends to cover a surface of the relief lip.

Another aspect of the present invention is to provide a belt seal structure for engaging a glass window of an automobile. Included is an inner belt seal and an outer belt seal, both the inner and outer belt seals engageably attached to at least one flange of an automobile door frame. Also included is a plurality of sealing lips connected to and extending away from the inner and outer belt seals, where a surface portion of the sealing lips contact the glass window. The contacting surface portion is covered with the low friction material. Further included is a relief lip extending from at least one of the sealing lips. The relief lip is located proximate a substantially curved contacting surface portion of the sealing lip, where the low friction material extends to cover a surface of the relief lip.

According to a further aspect of the present invention, there is provided a method for sealably engaging a glass window of an automobile. The method involves providing a belt seal structure that has an inner belt seal and an outer belt seal, both the inner and outer belt seals engageably attached to at least one flange of an automobile door frame. A plurality of sealing lips connect to and extend away from the inner and outer belt seals, where a surface portion of the sealing lips contact the glass window. The contacting surface portion is covered with the low friction material. Also provided is a relief lip extending from at least one of the sealing lips. The relief lip has a substantially planar geometry and is located proximate a substantially curved contacting portion of the sealing lip. The low friction material extends to cover a surface of the relief lip. The method involves raising and lowering of the glass window in a plane between the inner belt seal and the outer belt seal. An inner face and an outer face of the window contacts the low friction material covering the sealing lips and the relief lip upon passage through the belt seal structure.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
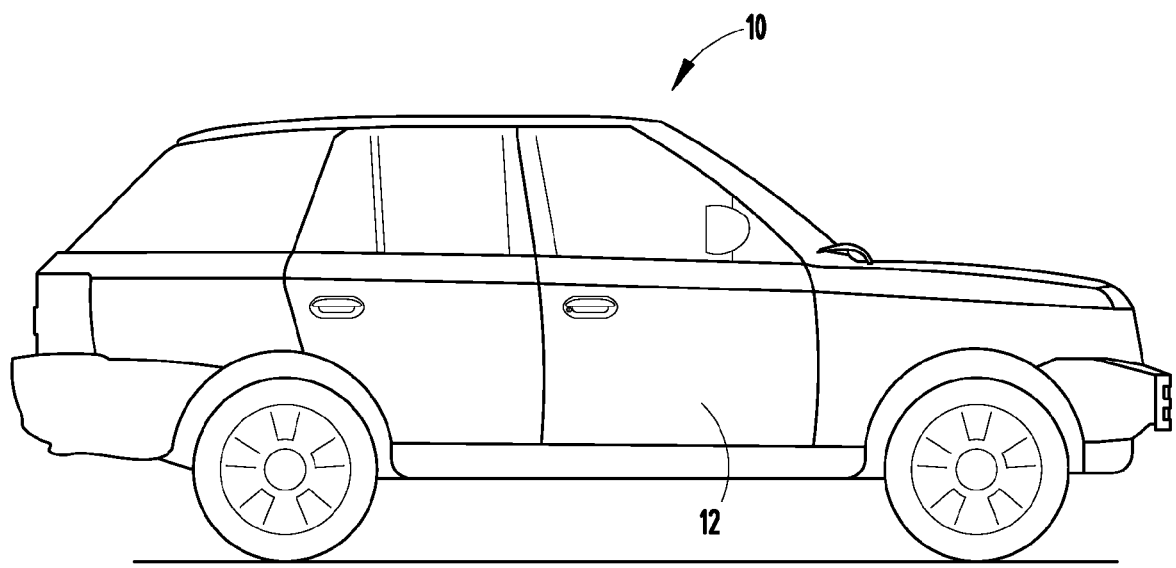
FIG. 1 is an elevated view of an automotive vehicle.
Figure 2:
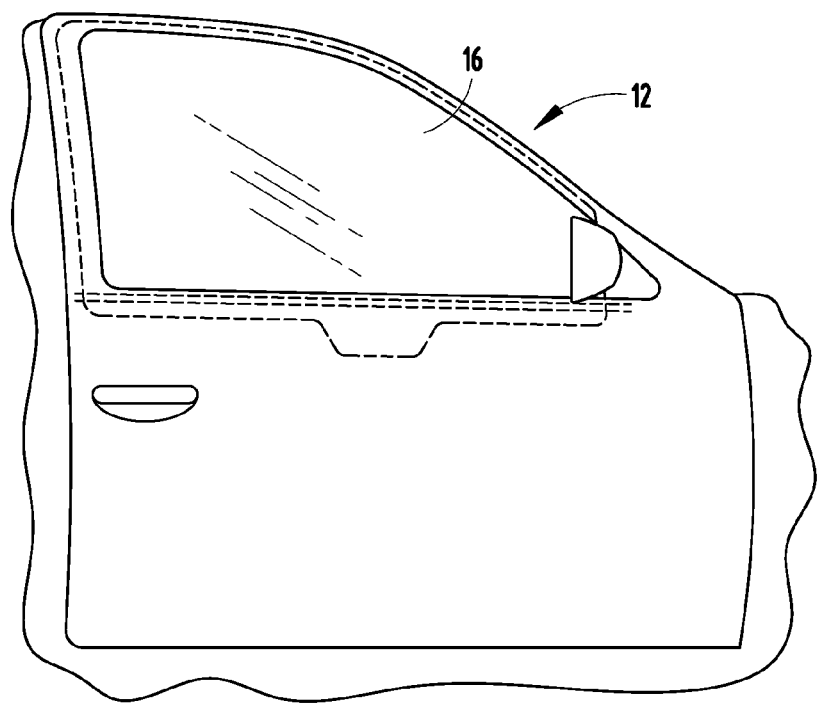
FIG. 2 is an elevated front side view of a door employed on the automotive vehicle.
Figure 2A:
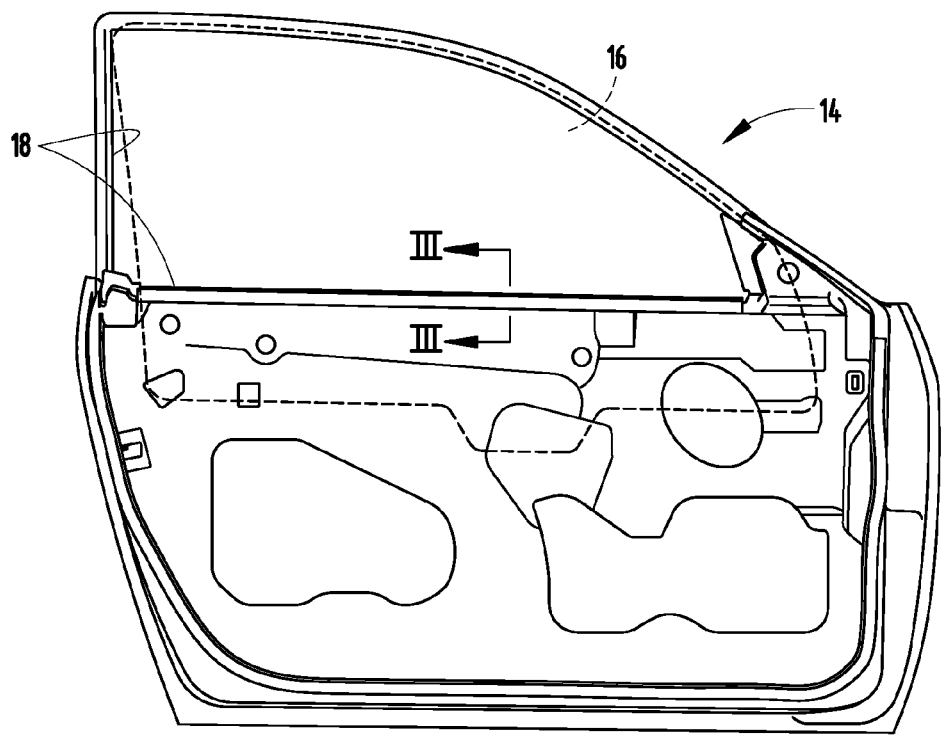
FIG. 2A is an elevated front side of an automotive vehicle door frame.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 generally designates an automobile or automotive vehicle equipped with passenger doors including a door 12 having a belt seal structure for engaging a glass window of the automobile (FIG. 1). The belt seal structure has an inner and an outer belt seal, both of which are attached to at least one flange of an automobile door frame. A plurality of sealing lips are connected to, and extend from, the inner and outer belt seals. A surface portion of the sealing lips contact the glass window and the contacting surface portion of the sealing lips are covered with a low friction material. At least one of the sealing lips has a relief lip that is located proximate a substantially curved contacting surface portion of the sealing lip. A surface of the relief lip is covered with the low friction material.

The automobile door 12 is hingably attached to the automobile frame and pivots about a vertical axis. The door has a door frame 14 with a channel that houses and retains the glass window 16. The glass window has two faces, one facing the interior of the automobile and the other facing the exterior of the vehicle, and is situated along a plane substantially similar as that of the door frame 14 such that vertical raising and lowering of the window relative to the door frame is possible. The door frame has an opening that allows air to pass through upon lowering of the glass window.

Referring to FIGS. 2-8, the belt seal structure 20 is located proximate the perimeter 18 of the door frame opening. The seal structure 20 provides an ability to slidably raise and lower the glass window 16 within the door frame channel in a manner that precludes the migration of air, water, noise. As the glass window 16 is slid relative to the belt seal structure 20, the belt seal structure 20 guides the window 16 between the inner belt seal 22 and the outer belt seal 24. The inner and outer belt seals are made of a hard plastic material, typically a rubber, polypropolene, or any other suitable material, and may have a metal interior core 26 to ensure stiffness, according to one embodiment. The stiffness of the inner 22 and outer belt seal 24 allows engagement to the flange(s) of the automobile door frame 14. The outer belt seal 24 is located on the exterior side of the door frame channel and the inner belt seal 22 is located on the interior side of the door frame channel.

The inner and outer sealing lips 28 extend away from the inner and outer belt seals 22 and 24, inwardly toward the center of the door frame channel. The sealing lips 28 are made of a flexible and resilient material that is biased against the glass window 16 and capable of bending upon passage of the glass window 16 during a raising or lowering motion. A surface contact portion 30 of the sealing lips 28 contact the glass window 16, with the window 16 sliding against the sealing lips 28 during the raising or lowering motion. In order to prevent noise and vibration, the surface portion of each sealing lip 28 that contacts the glass window 16 is covered with a material 32 having a low coefficient of friction. The low friction material 32 is flock tape, according to one embodiment. According to other embodiments, the low friction material 32 may employ other materials such as thermoplastic materials, theremosetting materials, felt, pile, and slip coatings to cover the surface contact portion 30.

Figure 3:
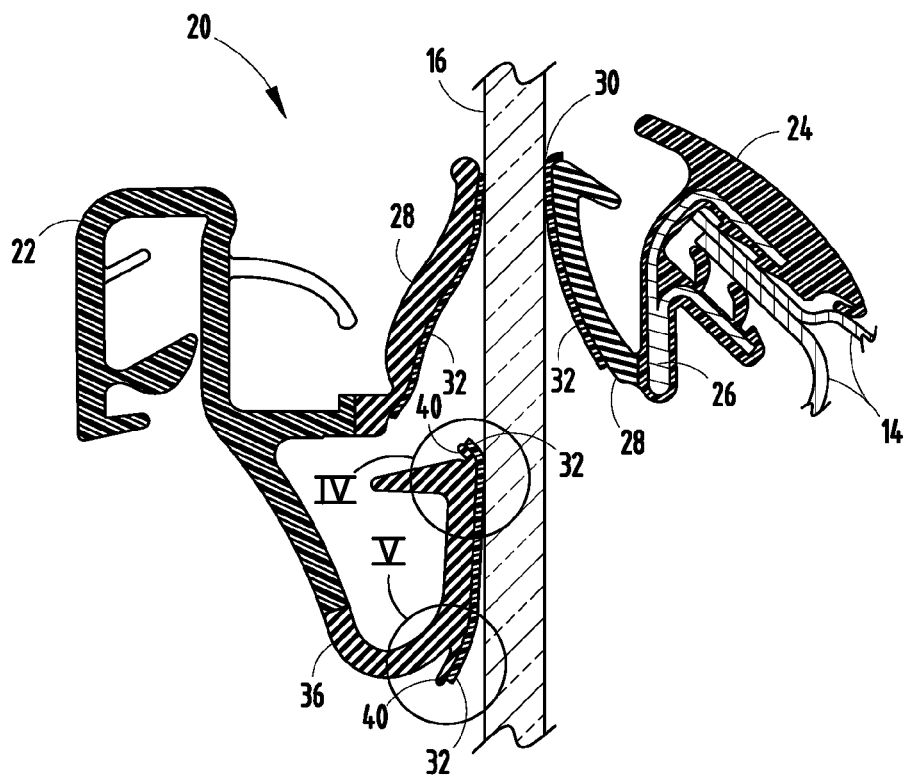
FIG. 3 is an elevated cross-sectional view of a belt seal structure having a sealing lip and a relief lip, according to one embodiment.
Figure 4:
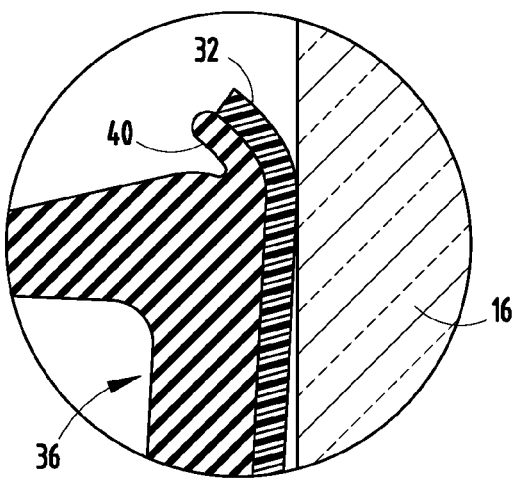
FIG. 4 is an enlarged view of section IV of FIG. 3, illustrating an upper portion of the sealing lip having a relief lip, according to one embodiment.
Figure 5:
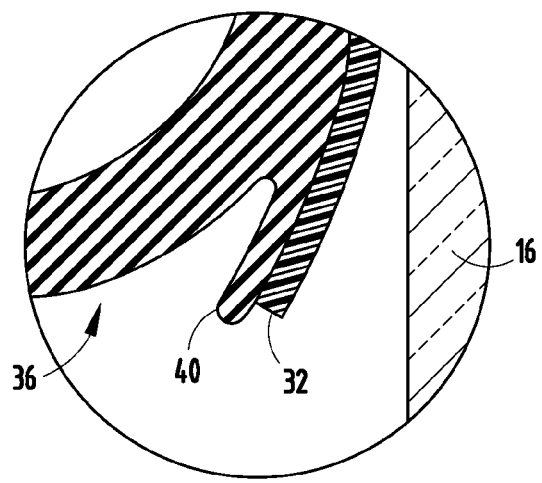
FIG. 5 is an enlarged view of section V of FIG. 3, illustrating a lower portion of the sealing lip having a relief lip, according to one embodiment.
Figure 6:
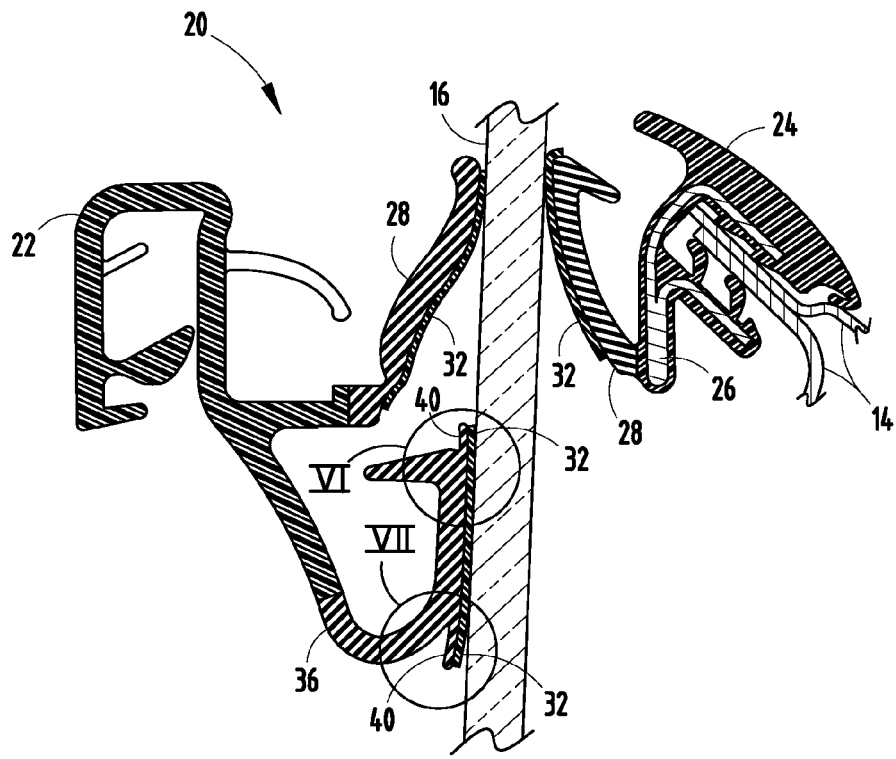
FIG. 6 is an elevational cross-sectional view of a belt seal structure having a sealing lip and a relief lip, according to another embodiment.
Figure 7:
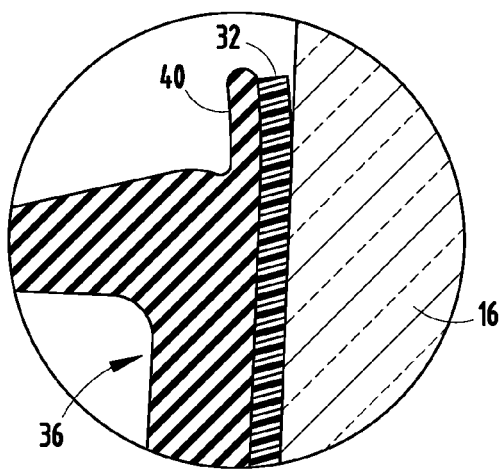
FIG. 7 is an enlarged view of section VII of FIG. 6, illustrating an upper portion of the sealing lip having a relief lip, according to another embodiment.
Figure 8:
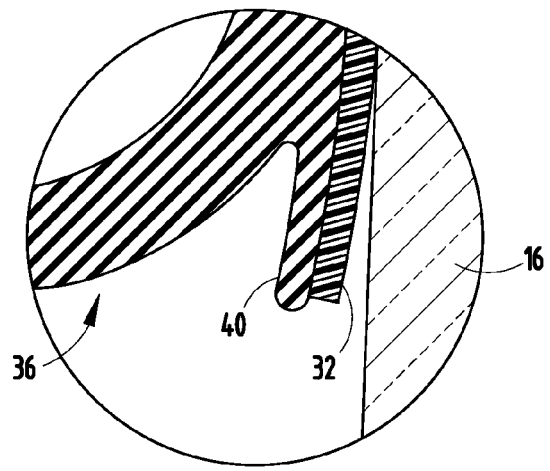
FIG. 8 is an enlarged view of section VII of FIG. 6, illustrating a lower portion of the sealing lip having a relief lip, according to another embodiment.

In order to obtain better guidance, sealing, and control during the raising and lowering motion of window 16, as well as to accommodate angled glass window configurations, at least one lower sealing lip 36 may be added at a location away from the window opening perimeter. FIGS. 3 and 6 illustrate such a lower sealing lip. Glass window contact with the lower sealing lip(s) 36 may occur if the glass window 16 is slightly angled within the door frame, for example due to manufacturing issues, as shown in FIGS. 6-8. The glass window 16 contacting surface contact portion 30 of these lower sealing lips 36 have a substantially planar body region, but a substantially curved surface at the extreme contacting portion(s) of the sealing lip. Adhesion of the low friction material 32 to the sealing lip 36 is enhanced by employing one or more relief lips 40 as shown in FIGS. 3-8. The relief lips 40 prevent or reduce the loss of adhesion of the friction material 32 to the sealing lips 36, particularly due to the additional stress of adhering to a curved surface.

The relief lip 40 is located proximate the extreme contacting portion(s) of the sealing lips 36 and has a degree of curvature less than that of the substantially curved surface of the sealing lip 36 (FIGS. 3-8). The relief lip 40 extends from the substantially planar body region of the sealing lip 36. The extreme edge of the low friction material 32 is applied to the relief lip surface 40. A greater level of securement of the adhesion of the low friction material 32 is achieved based on the geometric configuration of the relief lip 40. Increasing the level of adhesion prevents the low friction material from contributing to the noise and vibration that the belt seal structure 20 is intended to prevent. Conceivably, the belt seal structure 20 may have one or a plurality of relief lips 40 and the relief lips 40 could be employed at any curved surface.

A method for sealably engaging the automobile glass window 16 is accomplished by providing the belt seal structure 20. As previously described, the belt seal structure 20 has an inner belt seal 22 and an outer belt seal 24, both of which are engageably attached to at least one flange of an automobile door frame 14, a plurality of sealing lips 28, at least a portion of which are covered with a low friction material 32, and a relief lip 40 for at least one of the sealing lips 28. The low friction material 32 also covers a surface portion of the relief lip 40. The method also includes raising or lowering the glass window 16 in a plane between the inner belt seal 22 and the outer belt seal 24. An inner face and an outer face of the window contacts the low friction material 32 covering the sealing lips 28 and the relief lip 40 upon passage through the belt seal structure 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An automobile door comprising:
    a door frame having an upper edge portion;
    a glass window; and
    a belt seal structure comprising:
        an inner belt seal and an outer belt seal, wherein the inner and outer belt seals are attached to the upper edge portion of the door frame;
        a pair of upper sealing lips, wherein both the inner and outer belt seals have one of the upper sealing lips connected to and extending away from the inner and outer belt seals, wherein the upper sealing lips comprise a flexible material capable of bending to accommodate passage of the glass window, and wherein a surface portion of each upper sealing lip is covered with a low friction material, the surface portions comprising regions where the glass window contacts the upper sealing lips;
        at least one lower sealing lip connected to and extending away from the inner or outer belt seal, wherein the lower sealing lip comprises a flexible material capable of bending to accommodate passage of the glass window, wherein the lower sealing lip has a portion that is generally U-shaped in cross section with a smoothly curved lower portion extending between upwardly-extending inner and outer leg portions, the smoothly curved lower portion defining a concave inner surface and an outwardly-facing convex outer surface, wherein a side surface of the inner leg portion of the lower sealing lip is substantially planar and faces the glass window, and wherein at least a portion of the side surface is covered with a low friction material, the low friction material comprising regions where the glass window contacts at least a portion of the low friction material of the lower sealing lip, the inner leg having a main portion defining generally uniform thickness; and a relief lip extending from the inner leg portion of the U-shaped portion of the lower sealing lip and defining a first side surface facing the glass and a second side surface that faces away from the glass and a thickness that is substantially less than the thickness defined by the substantially planar main portion of the inner leg, wherein the first side surface of the relief lip is proximate the substantially planar section of the side surface of the lower sealing lip, and wherein the low friction material covers at least a portion of the first side surface of the relief lip.

2. The belt seal structure of claim 1, wherein the first side surface of the relief lip having a degree of curvature less than that of the outwardly-facing convex outer surface of the lower sealing lip.

3. The belt seal structure of claim 1, wherein the low friction material defines lower and upper opposite side edges, and wherein the lower sealing lip includes lower and upper relief lips extending downwardly and upwardly, respectively from the main portion of the inner leg, and wherein the lower and upper opposite side edges are disposed on the lower and upper relief lips, respectively.

4. The belt seal structure of claim 1, wherein the low friction material is flock tape.

5. The belt seal structure of claim 1, wherein the inner belt seal and the outer belt seal are a substantially hard plastic material.

6. The belt seal structure of claim 1, wherein the relief lip extends along a direction of a substantially similar plane as the main portion of the inner leg of the lower sealing lip.

7. A belt seal structure for an automobile glass window comprising:
a belt seal engagable to an automobile flange;
a sealing lip extending from the belt seal and having a U-shaped portion comprising an upwardly-extending inner leg having a main portion defining a generally uniform thickness and a planar side surface, the U-shaped portion further including a smoothly curved central portion joined with the upwardly-extending leg at a junction region, the central portion having a thickness that is approximately equal to the thickness of the main portion of the leg, the central portion having a generally convex outer surface;
a relief lip comprising a flap projecting from the junction region of the sealing lip, the relief lip having inner and outer surfaces defining a thickness therebetween that is much less than the thickness of the main portion of the leg, and wherein the inner surface of the relief lip faces a portion of the outer surface of the central portion and defines a groove having a root of which is at the junction region; and
low friction material disposed on the planar side surface and the outer surface of the relief lip.

8. The belt seal structure of claim 7, wherein the sealing lip comprises a downwardly-extending lower relief lip, and wherein the sealing lip further includes an upper relief lip projecting from the upper end portion, and wherein the low friction material covers at least a portion of the lower and upper relief lips.

9. The belt seal structure of claim 8, wherein the upper and lower relief lips have central portions that are much thinner than the thickness of the main portion of the inner leg.

10. The belt seal structure of claim 9, wherein the central portions of the relief lips have substantially uniform thicknesses.

11. The belt seal structure of claim 10, wherein the central portions of the relief lips define concave inner surfaces and convex outer surfaces.

12. The belt seal structure of claim 7, wherein the low friction material defines inner and outer surfaces and first and second opposite side edges, and wherein the inner surface of the low friction material at the first side edge is adhered to the outer surface of the relief lip.

13. The belt seal structure of claim 7, wherein the low friction material is flock tape.

14. The belt seal structure of claim 7, wherein the belt seal is a substantially hard plastic material.

15. The belt seal structure of claim 7, wherein the belt seal structure adapted to be mounted to an edge of an automobile frame at a window opening.

16. The belt seal structure of claim 7, further comprising a plurality of belt seals, including an inner belt seal and an outer belt seal, wherein the inner belt seal has a lower sealing lip connected to and extending away from the inner belt seal, the lower sealing lip having the relief lip.

17. The belt seal structure of claim 7, wherein the sealing lip is a flexible material capable of bending to accommodate passage of a glass window.

18. A method for sealably engaging a glass window of an automobile comprising:
Providing the belt seal structure of claim 7, having an inner belt seal and an outer belt seal, both the inner and outer belt seals engagably attached to at least one flange of an automobile door frame; a plurality of sealing lips connected to and extending away from the inner and outer belt seals, wherein a surface portion of the sealing lips contact the glass window, and wherein the contacting surface portion is covered with a low friction material; a relief lip extending from at least one of the sealing lips, located proximate a substantially curved contacting portion of the sealing lip, wherein the low friction material extends to cover a surface of the relief lip; and
raising or lowering of the glass window in a plane between the inner belt seal and the outer belt seal, wherein an inner face and an outer face of the window contacts the low friction material covering the sealing lips and the relief lip upon passage through the belt seal structure.

19. The method of claim 17, wherein the low friction material defines and edge, the method further comprising extending the relief lip to define an end surface, such that the end surface of the relief lip is located beyond the edge of the low friction material.

20. The method of claim 17, wherein the relief lip forms a thin, cantilevered flange extending from at least one of the sealing lips.

* * * * *